A. H. SMITH.
Car-Starter.

No. 164,049. Patented June 1, 1875.

Witnesses
Chas H Smith
H Arved Sewell

Inventor
Andrew H. Smith
per Lemuel W. Serrell
atty

UNITED STATES PATENT OFFICE.

ANDREW H. SMITH, OF NEW YORK, N. Y.

IMPROVEMENT IN CAR-STARTERS.

Specification forming part of Letters Patent No. 164,049, dated June 1, 1875; application filed November 16, 1874.

*To all whom it may concern:*

Be it known that I, ANDREW H. SMITH, of the city and State of New York, have invented an Improvement in Stopping and Starting Railway-Cars, of which the following is a specification:

Various devices have been proposed for utilizing the inertia in stopping a car, by applying it to wind up a spring, which, in turn, is made to exert its power in starting the car. These devices, however, are mostly complicated and difficult of application and use, and cannot be applied as a brake to check the momentum of a car while running down hill.

My device is available either as a brake or for starting the car, and it is operated similarly to an ordinary brake, and when not in use revolves without friction, and without interfering in any manner with the ordinary running-gear of the car.

Figure 2:
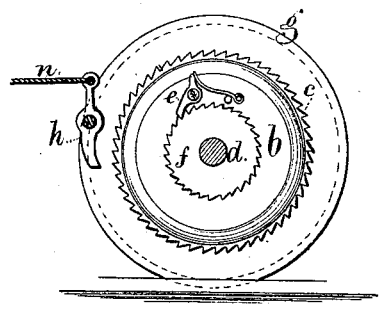
Figure 3:
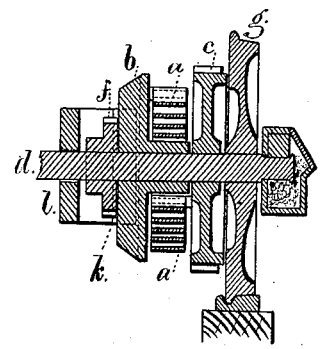
Figure 1:
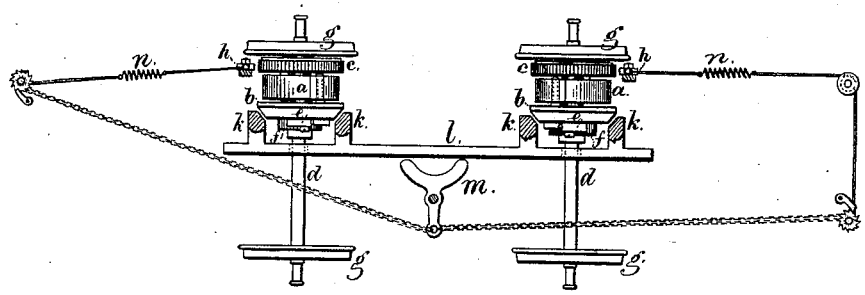

In the drawing, Figure 1 is a general plan, showing the arrangement of the apparatus as applied to a car. Fig. 2 is an elevation, and Fig. 3 is a section, of the same.

I make use of a flat volute spring, $a$, the ends of which are connected to two wheels, $b$ and $c$, that are loose upon the car-axle $d$. One of these wheels, $b$, is provided with a pawl, $e$, taking a ratchet-wheel, $f$, fixed upon the car-axle $d$. The hub of the wheel $b$ extends to the surface of the wheel $c$, so that pressure applied to the wheel $b$, which is the brake-wheel, forces the wheel $c$ against the side of one of the car-wheels $g$, or against a friction-wheel specially provided for it upon the axle $d$, and around this wheel $c$ are ratchet-teeth for the stationary pawl $h$. The brake-blocks $k$ are to be operated by any competent power, and when pressed against the wheel $b$ its motion is wholly or partially stopped. At the same time the wheel $c$ is revolved by its frictional contact with $g$, and the amount of its motion is retained by the pawl $h$. In this way the spring will be wound up more or less rapidly, according to the frictional power resulting from the pressure of the brake-blocks, and the car can be stopped in a greater or less distance. When the pressure of the brake-blocks is relieved the spring reacts, and as the wheel $c$ cannot turn back in consequence of the pawl $h$ the power of the spring is exerted to turn the wheel $b$ forward, which, acting through the pawl $e$ on the wheel $b$ and axle $f$, revolves the car-wheel forward and starts the car, thus utilizing the inertia of the car in stopping to start the same.

It will now be evident that if the pawl $h$ remains out of action the apparatus will revolve with the axle and be entirely inoperative; but it may be used as a car-brake only when running in either direction, because the friction will be upon the respective surfaces, and if the direction of the car is such as to wind up the spring it unwinds without exerting its power to propel the car; but if the direction of motion of the car be reversed the ratchet-wheel $f$ acts, through the pawl $e$, to propel the wheel $b$, and hence the brakes acting against that wheel tend only to stop the car. I avail myself of these conditions, and place on one axle a spring and friction-wheels to operate when the car is going one way, and on the other axle an apparatus to operate when the car is going the other way, and provide pawls $h$ for the respective wheels that will hang out of action, and I connect the brake-blocks preferably to one brake-bar, $l$, as shown in Fig. 1, and operate the same from the ordinary brake-shaft and handle at either end of the car; and for that purpose I employ the cam $m$, or any other convenient device, and I arrange a spring-connection, $n$, to the brake-lever or handle, that brings the proper pawl into operation to act with the stopping and starting mechanism at the advancing end of the car, so that the proper apparatus will be brought into action to wind up the spring as the car is being stopped, and, at the same time, the other apparatus operates simply as a brake, as aforesaid; and when the pressure of the brake-blocks is relieved, the spring that has been wound up exerts its power in starting the car, and then the pawl $h$ falls out of action, and both the appliances upon the axles revolve with them and the wheels without any wear or friction except that resulting from the increased weight resting on the car-wheels.

In the arrangements shown in Fig. 1 the parts will have to be handed; but by applying the apparatus to one side on one axle and the other side on the other axle this will be avoided, and the brakes will then be operated by levers.

This apparatus is very simple and comparatively inexpensive, and all the parts are easily accessible for oiling or repairs.

I claim as my invention—

1. The friction-wheels $b$ and $c$ and the spring $a$, attached at its ends to said wheels, in combination with the pawls $e$ and $h$ and brake-blocks $k$, substantially as and for the purposes set forth.

2. The bar $l$, carrying the brake-blocks $k$, and to be operated by a connection to the hand-brake, in combination with the brake-wheel $b$, ratchet-wheel $f$, and pawl $e$, for operating the wheel $b$ as an ordinary brake when the motion of the car is reversed, as set forth.

Signed by me this 11th day of November, A. D. 1874.

ANDREW H. SMITH.

Witnesses:
GEO. T. PINCKNEY,
CHAS. H. SMITH.